G. WESTINGHOUSE, Jr.
Steam-Power Brake-Couplings.

No. 136,631.                              Patented March 11, 1873.

Witnesses
James L Kay
L. E. Henderson

Inventor
George Westinghouse Jr.
by Bakewell, Christy & Kerr,
his Att'ys.

UNITED STATES PATENT OFFICE.

GEORGE WESTINGHOUSE, JR., OF PITTSBURG, PENNSYLVANIA.

IMPROVEMENT IN STEAM-POWER-BRAKE COUPLINGS.

Specification forming part of Letters Patent No. 136,631, dated March 11, 1873.

*To all whom it may concern:*

Be it known that I, GEORGE WESTINGHOUSE, Jr., of Pittsburg, in the county of Allegheny and State of Pennsylvania, have invented a new and useful Improvement in Steam-Power-Brake Couplings; and I do hereby declare the following to be a full, clear, and exact description thereof, reference being had to the accompanying drawing making part of this specification, in which—

Figure 1:
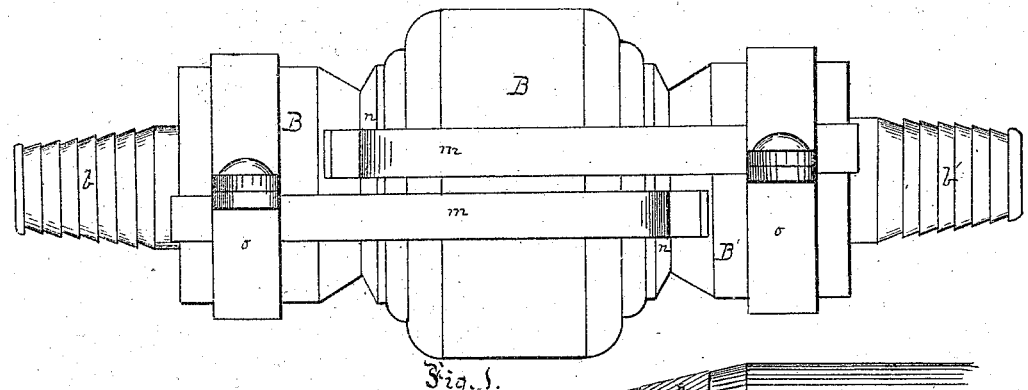
Figure 2:
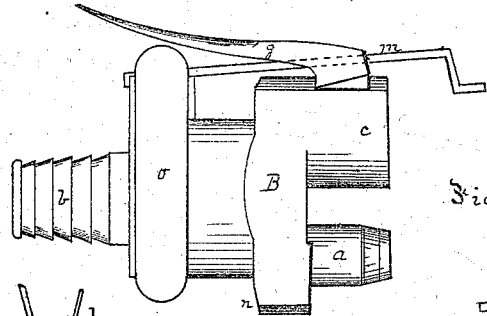
Figure 3:
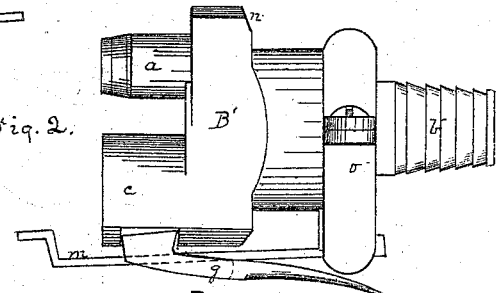
Figure 3:
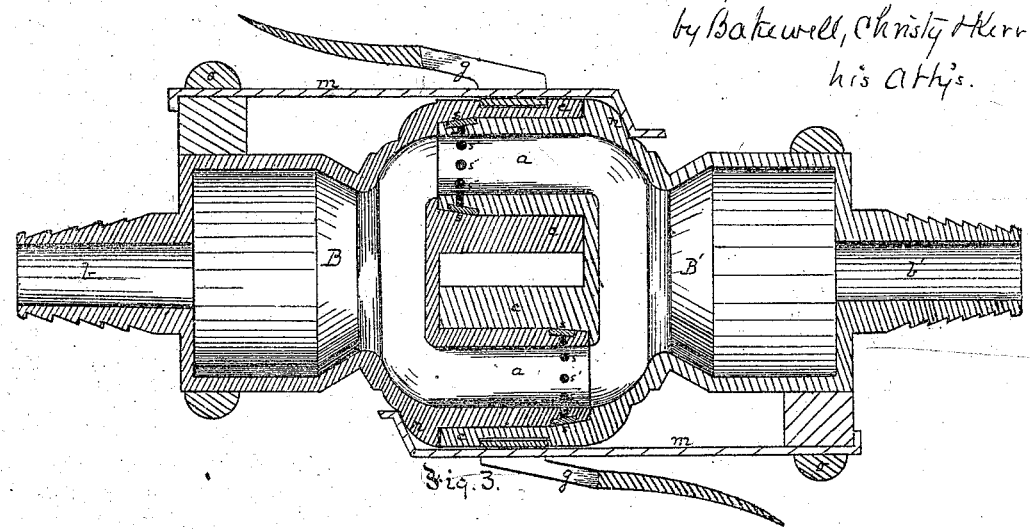

Figure 1 is an outside view of my improved coupling as united in coupling. Fig. 2 is a like view, somewhat reduced, with the male and female parts disconnected and turned one-quarter way around. Fig. 3 is a longitudinal section of the devices coupled together; and Fig. 4, by an enlarged view of the male part, illustrates a modification of the packing devices.

Like letters of reference indicate like parts in each.

In the patent granted to me August 8, 1871, No. 117,841, provision is made for the reversal of a car without changing the relative arrangement of the couplings. This is done by branching the air-brake pipe at or near each end of the car, and attaching a male coupling to one branch and a female coupling to the other, as therein described.

In my present improvement I accomplish the same useful result by making a coupling wherein each half shall have a male and female part to couple into or with the female and male parts of the next coupling. With couplings so made there will be no occasion to branch the pipes, and the half-coupling on either end of either car will couple onto any other half-coupling on the train.

To enable others skilled in the art to make and use my improvement, I will proceed to describe its construction and mode of operation.

B and B' represent the shells, terminating at their outer ends in pipes $b$ $b'$, by which they are connected with the flexible pipe or hose. At their inner ends each one terminates in a nozzle or male part, $a$, and a socket or female part, $c$, and the parts are so shaped that each nozzle $a$ shall couple neatly into the socket $c$ of the opposite half-coupling. These nozzles $a$ are provided with packing-rings $s$ and air-holes $s'$, as described in the patent granted to me November 29, 1870, and for the same purposes, as also with spring-hooks $m$ engaging on beads or shoulders $n$, and also clamping-rings $o$. But the devices for packing the joint and holding the two halves together, as well as for uncoupling, may be varied at pleasure. But it will be observed that whatever devices be employed for holding the two halves together they must be duplicated in each half, and arranged opposite each other in each half. Thus the spring-hook $m$ must in each half be opposite the shoulder or catch $n$ in the same half, and also diagonally opposite the spring-hook of the other half-coupling. Were both springs on one half, and the catch only on the other half, the reversal of a car end for end would render it impossible to unite any of the couplings.

In the drawing I have shown two modifications of these devices. In Figs. 2 and 3 is represented with each spring-hook $m$ a thumb or hand lever $g$ for convenience in hooking and unhooking them from the beads or shoulders $n$. These levers may be set in recesses in the shells B B', or pivoted to lugs arranged thereon like a thumb-latch, or otherwise connected at pleasure. Their manner of operation and their function will be obvious without further explanation.

Figure 4:
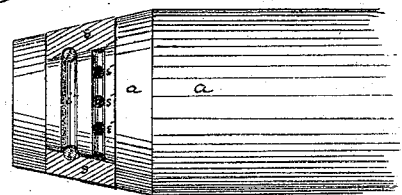

The other modification is shown in Fig. 4, which represents the male part or nozzle $a$ considerably enlarged, but with the packing-ring $s$ in section. As an additional means of forcing the packing-ring $s$ outward against the inner wall of the female part or socket $c$, I use an elastic metallic spring, $i$, either of wire, as shown, or it may be flat or of other suitable shape. This spring I arrange in a groove, $i'$, under the ring, where its action will be similar to that of the metallic packing-rings commonly employed in steam-pistons.

It will now be seen that the two half-couplings are counterparts of each other, and that any one half-coupling may be united to any other half-coupling, so that no difficulty will be experienced from cars being changed end for end.

The couplings described may be furnished with any suitable form of valve—self-seating and automatically unseating, or otherwise—at pleasure; or, if no valve is employed, the rear coupling in a train should be closed by a cap or in other suitable way.

What I claim as my invention, and desire to secure by Letters Patent, is—

1. A pipe-coupling for air, steam, or other fluid brakes, in which each half is supplied with, first, a male and female part; second, a spring-hook, $m$, on one side of the outer face to engage a catch on the corresponding side of the other half; and third, a catch, $n$, opposite the spring-hook, on which to engage the spring-hook of the other half, substantially as set forth.

2. In combination with the male and female parts of a coupling, the metallic spring $i$ and packing-ring $s$ arranged with reference to securing an air-tight joint between the contiguous walls of the two, substantially as set forth.

In testimony whereof I, the said GEORGE WESTINGHOUSE, Jr., have hereunto set my hand.

GEORGE WESTINGHOUSE, JR.

Witnesses:
JOHN H. BAILEY,
G. H. CHRISTY.